US011969792B2

(12) United States Patent
Gonzalez et al.

(10) Patent No.: US 11,969,792 B2
(45) Date of Patent: Apr. 30, 2024

(54) ADDITIVE MANUFACTURING MACHINE COMPRISING A DEVICE FOR THE DISTRIBUTION OF POWDER ONTO A MOBILE SURFACE USING A SCREW DISTRIBUTOR

(71) Applicant: AddUp, Cebazat (FR)

(72) Inventors: Antonio Gonzalez, Cebazat (FR); Olivier Gonnard, Clermont-Ferrand (FR)

(73) Assignee: ADDUP, Cebazat (FR)

( * ) Notice: Subject to any disclaimer, the term of this patent is extended or adjusted under 35 U.S.C. 154(b) by 0 days.

(21) Appl. No.: 17/052,639

(22) PCT Filed: May 2, 2019

(86) PCT No.: PCT/FR2019/051013
§ 371 (c)(1),
(2) Date: Nov. 3, 2020

(87) PCT Pub. No.: WO2019/211564
PCT Pub. Date: Nov. 7, 2019

(65) Prior Publication Data
US 2021/0245256 A1    Aug. 12, 2021

(30) Foreign Application Priority Data

May 3, 2018    (FR) ..................... 1853835

(51) Int. Cl.
*B22F 12/57*    (2021.01)
*B22F 10/28*    (2021.01)
(Continued)

(52) U.S. Cl.
CPC ............. *B22F 12/57* (2021.01); *B22F 10/28* (2021.01); *B22F 12/33* (2021.01); *B33Y 30/00* (2014.12)

(58) Field of Classification Search
CPC ........... B22F 12/57; B22F 12/33; B22F 10/28
See application file for complete search history.

(56) References Cited

U.S. PATENT DOCUMENTS 5,846,370 A * 12/1998 O'Connor .............. B33Y 30/00
156/272.8
8,550,802 B2    10/2013 Fuwa et al.
(Continued)

FOREIGN PATENT DOCUMENTS

CN    201678260 U    12/2010
CN    204546994 U *  8/2015
(Continued)

OTHER PUBLICATIONS

International Search Report dated Aug. 16, 2019, in corresponding PCT/FR2019/051013 (4 pages).

*Primary Examiner* — Farah Taufiq
(74) *Attorney, Agent, or Firm* — VENABLE LLP

(57) ABSTRACT

A powder bed fusion additive manufacturing machine (10) comprises: a manufacturing chamber (12), at least one mobile powder-receiving surface (28) and a manufacturing zone (20) situated inside the manufacturing chamber, a powder-spreading device (30), and at least one powder-distribution device (32) distributing powder over the mobile receiving surface. The distribution device comprises a buffer reservoir (40) connected to a powder supply (42), and a powder-distribution point (P1) beneath which a mobile receiving surface (28) moves, and the powder-distribution device comprises a screw-type metering device (44) connecting the buffer reservoir (40) and the powder-distribution point (P1) and enabling the generation of a continuous stream of powder from the buffer reservoir towards the powder-distribution point.

7 Claims, 3 Drawing Sheets

(51) Int. Cl.
  *B22F 12/33* (2021.01)
  *B33Y 30/00* (2015.01)

(56) References Cited

U.S. PATENT DOCUMENTS

| | | | |
|---|---|---|---|
| 10,967,568 B2 | 4/2021 | Walrand | |
| 2010/0200479 A1* | 8/2010 | Yang | B29C 48/6916 |
| | | | 210/392 |
| 2011/0109016 A1* | 5/2011 | Fuwa | B22F 10/20 |
| | | | 264/460 |
| 2013/0068667 A1* | 3/2013 | Bezuidenhout | B29B 13/10 |
| | | | 209/247 |
| 2015/0321256 A1* | 11/2015 | Abe | B05C 11/028 |
| | | | 425/78 |
| 2018/0001556 A1* | 1/2018 | Buller | B29C 64/371 |
| 2019/0001560 A1 | 1/2019 | Walrand | |
| 2019/0134909 A1* | 5/2019 | Nicaise | B29C 64/379 |
| 2021/0107064 A1* | 4/2021 | Zhang | B29C 64/153 |

FOREIGN PATENT DOCUMENTS

| | | |
|---|---|---|
| CN | 107952955 A | 4/2018 |
| EP | 2281677 A1 | 2/2011 |
| WO | 2017/108868 A1 | 6/2017 |

\* cited by examiner

ADDITIVE MANUFACTURING MACHINE COMPRISING A DEVICE FOR THE DISTRIBUTION OF POWDER ONTO A MOBILE SURFACE USING A SCREW DISTRIBUTOR

BACKGROUND

The invention falls within the field of powder-based additive manufacturing by melting grains of this powder with the aid of one or more sources of energy or of heat, such as a laser beam and/or a beam of electrons and/or of diodes.

More specifically, the invention falls within the field of additive manufacture through the deposition of a bed of powder and seeks to supply the device with powder in a way that allows the additive-manufacturing powder to be layered inside a powder bed fusion additive manufacturing machine.

More specifically still, the invention seeks to supply a mobile powder-receiving surface with a stable and controlled rate of flow of powder.

Application WO2017108868 describes a powder bed fusion additive manufacturing machine comprising a manufacturing chamber inside which there is a working plane and at least one working zone in which layers of powder are spread and consolidated selectively in succession one after another.

In order to create the various layers of powder useful to manufacture, the machine described in application WO2017108868 comprises a powder-spreading device, such as a roller or a scraper, able to be moved over the working zone, and a powder-depositing device that deposits powder on the working plane and comprises a powder-receiving slide and a powder injector. The slide is able to move in translation, with respect to the working plane, between a retracted position in which the slide extends outside the trajectory of the powder-spreading device, and a deployed position in which the slide extends at least in part into the trajectory of the powder-spreading device. The injector is positioned above the powder-receiving slide, so as to distribute powder over the receiving slide when this slide is moving between its retracted position and its deployed position.

This application WO2017108868 also anticipates for the injector to be connected to a powder reservoir, for example via a coupling of flexible type, and for a metering hopper to be interposed between the reservoir and the injector.

However, this application WO2017108868 specifies neither a precise arrangement of the metering hopper nor a precise arrangement of the means for distributing the powder over the mobile slide.

Now, with a mobile powder-receiving surface as planned in application WO2017108868, it is necessary to deliver a controlled rate of flow of powder at the exit of the injector and that remains stable as the slide moves.

This is because the quality of the run of powder deposited on the slide is directly connected with the quality of the components manufactured.

If the rate of flow of powder lessens as the slide is moving, certain layers of powder spread out over the working zone will have thicknesses that are insufficient in places, and this will lead to the manufacture of components that exhibit defects or are non-compliant.

Furthermore, if the rate of flow of powder is too great during all or part of the movement of the slide, a certain quantity of powder will be deposited in needless excess and will increase the already great quantity of powder that is not consolidated and that, in certain applications such as the manufacture of medical prostheses, cannot be reused without being melted down and reconditioned into powder form once again.

It is an objective of the present invention to provide a powder-distribution device capable of delivering a stable and controlled flow rate of powder at least at a point situated above a mobile powder-receiving surface that is able to position itself in the vicinity of the working zone.

SUMMARY OF INVENTION

To this end, one subject of the invention is a powder bed fusion additive manufacturing machine, this additive manufacturing machine comprising a manufacturing chamber and at least one source of heat or of energy used to selectively melt a layer of an additive manufacturing powder deposited inside the manufacturing chamber. In addition, the additive manufacturing machine comprises at least one mobile powder-receiving surface able to move in the vicinity of a manufacturing zone situated inside the manufacturing chamber, a powder-spreading device for spreading the powder on the mobile receiving surface towards the manufacturing zone, and at least one powder-distribution device distributing powder onto the mobile receiving surface.

According to the invention, the powder-distribution device comprises a buffer reservoir connected to a powder supply, and a powder-distribution point beneath which a mobile receiving surface moves.

Still according to the invention, the powder-distribution device comprises a screw-type metering device connecting the buffer reservoir and the powder-distribution point and enabling the generation of a continuous stream of powder from the buffer reservoir towards the powder-distribution point.

This powder-distribution device is advantageously supplemented by the following features considered alone or in combination:

the screw-type metering device comprises a barrel and at least one powder-conveying screw rotationally driven inside this barrel, the screw-type metering device comprises two powder-conveying screws juxtaposed inside the one same barrel and rotationally driven inside this barrel, the two screws of the metering device have pitches of the same hand, the two screws of the metering device have pitches of opposing hand, the two screws of the metering device are synchronized in rotation and the two screws of the metering device rotate in the same, clockwise or anticlockwise, direction, the distribution device comprises a powder-unpacking device to loosen the powder contained in the buffer reservoir, this unpacking device notably adopting the form of a blade driven in rotation inside the buffer reservoir.

BRIEF DESCRIPTION OF THE DRAWINGS

Other features and advantages of the invention will become apparent in the description which follows. This description, given by way of non-limiting example, refers to the appended drawings, in which.

DETAILED DESCRIPTION

The invention relates to a powder bed fusion additive manufacturing machine. Powder bed fusion additive manufacturing is an additive manufacturing method in which one or more components are manufactured by the selective melting of various mutually superposed layers of additive manufacturing powder. The first layer of powder is deposited on a support such as a platform, then selectively sintered or melted using one or more sources of energy or of heat along a first horizontal section of the component or components being manufactured. Next, a second layer of powder is deposited on the first layer of powder which has just been melted or sintered, and this second layer of powder is selectively sintered or melted in its turn, and so on, until the last layer of powder of use in the manufacture of the last horizontal section of the component or components being manufactured.

Figure 1:
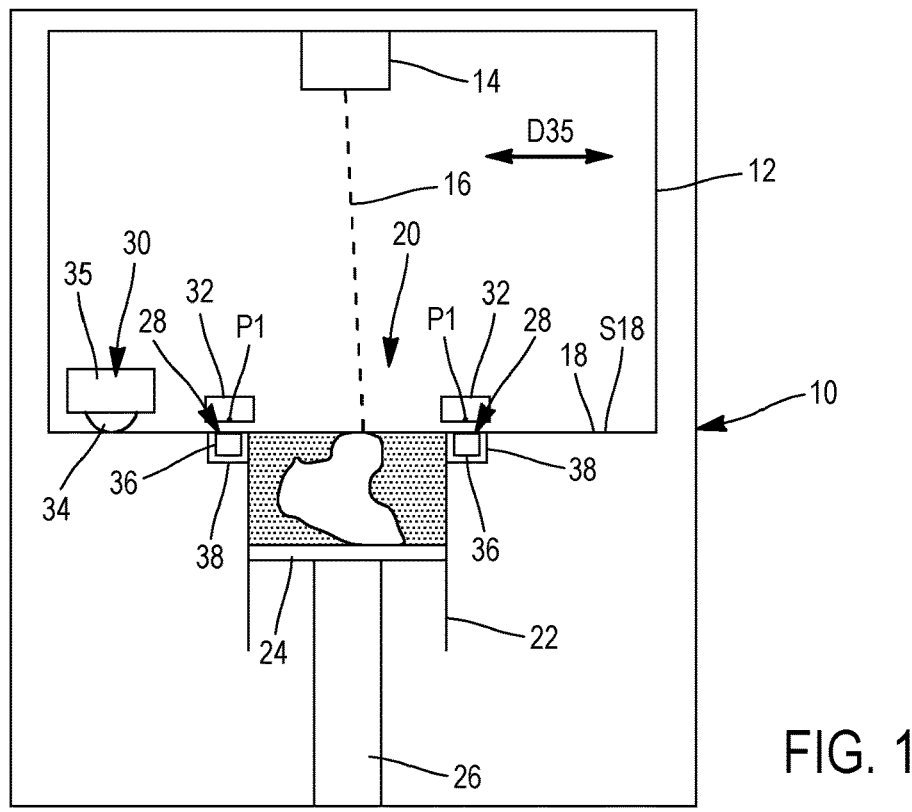
FIG. 1 is a schematic face-on view of an additive manufacturing machine according to the invention.

As illustrated in FIG. 1, and in order to allow powder bed fusion additive manufacture of components, the additive manufacturing machine 10 according to the invention comprises a manufacturing chamber 12 and at least one source 14 of heat or of energy used to selectively, via one or more beams 16, melt a layer of an additive manufacturing powder deposited inside the manufacturing chamber 12.

The heat or energy source or sources 14 may adopt the form of sources capable of producing one or more beams of electrons and/or one or more laser beams. These sources are, for example, one or more electron guns and/or one or more laser sources. In order to allow selective fusion and therefore allow the beam or beams 16 of energy or of heat to be moved, each source 14 comprises means for moving and controlling the beam or beams 16.

The manufacturing chamber 12 is a closed chamber. One wall of this manufacturing chamber 12 may comprise a window so that the manufacturing progress within the chamber can be observed. At least one wall of this manufacturing chamber 12 comprises an opening providing access to the inside of the chamber for maintenance or cleaning operations, it being possible for this opening to be sealed closed again by a door during a manufacturing cycle. During the manufacturing cycle, the manufacturing chamber 12 may be filled with an inert gas such as nitrogen in order to prevent the additive manufacturing powder from oxidizing and/or in order to prevent the risks of explosion. The manufacturing chamber 12 may be maintained at a slight overpressure in order to avoid the ingress of oxygen, or may be maintained under vacuum when an electron beam is used inside the chamber to sinter or fuse the powder.

Inside the manufacturing chamber 12, the additive manufacturing machine 10 according to the invention comprises: a horizontal working plane 18 and at least one manufacturing zone 20 situated in the working plane 18. A manufacturing zone 20 is defined by an opening 21 made in the horizontal working plane 18 and by a build sleeve 22 and a build platform 24. The sleeve 22 extends vertically beneath the working plane 18 and opens into the working plane 18 via the opening 21. The build platform 24 slides vertically inside the build sleeve 22 under the effect of an actuator 26 such as a ram.

In order to create the various layers of powder of use in the additive manufacture of the component or components being manufactured, the additive manufacturing machine according to the invention comprises at least one mobile powder receiving surface 28 able to move in the vicinity of a manufacturing zone 20 situated inside the manufacturing chamber. The additive manufacturing machine also comprises a powder-spreading device 30 able to spread the powder from the mobile receiving surface 28 towards the manufacturing zone 20, and a powder-distribution device 32 distributing powder onto the mobile receiving surface.

The spreading device 30 adopts the form of a scraper and/or of one or more rollers 34 mounted on a carriage 35. This carriage 35 is mounted with the ability to effect translational movement in a horizontal direction D35 above the manufacturing zone 20. In order to be driven in horizontal translation, the carriage 35 may be motorized, or set in motion by a motor situated inside, or preferably outside, the manufacturing chamber 12 and via a movement-transmission system such as pulleys and a belt.

Figure 2:
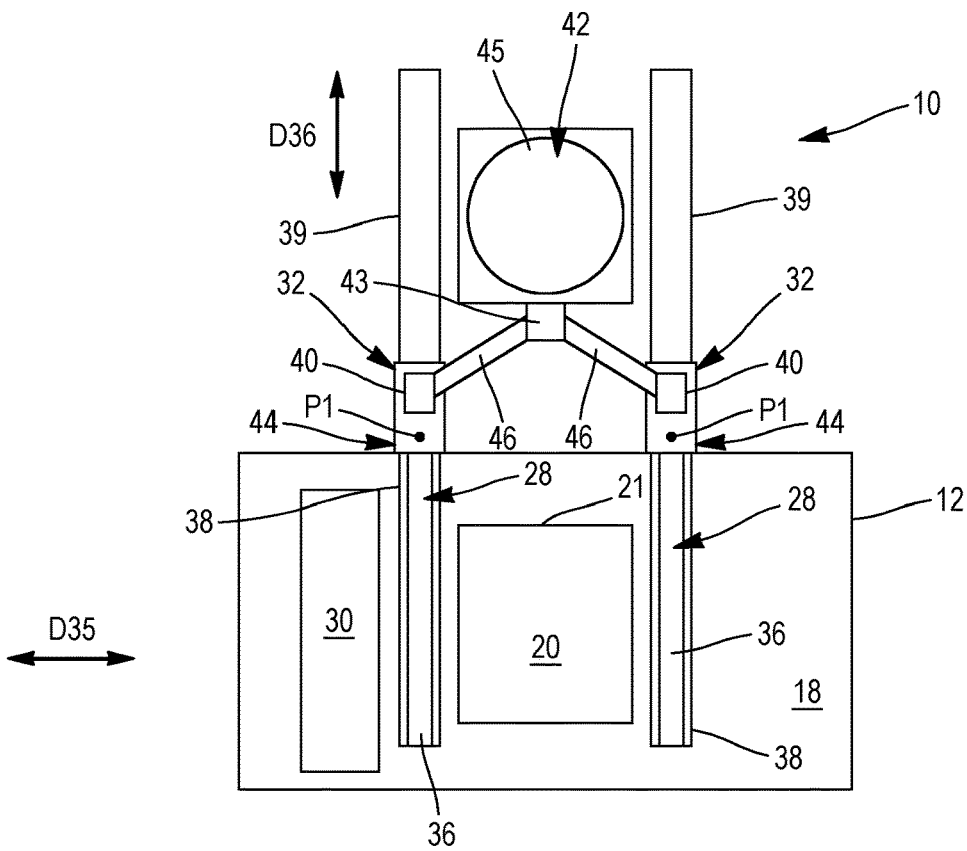
FIG. 2 is a schematic view from above of an additive manufacturing machine according to the invention.

As a preference and as illustrated in FIGS. 1 and 2, the additive manufacturing machine according to the invention comprises two mobile powder-receiving surfaces 28 and two powder-distribution devices 32, each mobile powder-receiving surface receiving powder distributed by at least one distribution device. In greater detail, one mobile receiving surface and one distribution device are provided on each side of the manufacturing zone 20 in the horizontal direction D35 of travel of the carriage 35 of the spreading device 30. Thus, the powder-spreading device does not make any needless journey over the manufacturing zone because it is able to spread powder in both senses of its horizontal direction D35 of travel.

Again as a preference, a mobile powder-receiving surface 28 adopts the form of a slide 36. A slide 36 is mounted with the ability to effect translational movement in a horizontal direction D36 that is transverse in relation to the manufacturing zone 20. A slide 36 moves between a retracted position in which this slide is situated outside of the trajectory of the powder-spreading device 30, and a deployed position in which this slide extends at least in part into the trajectory of the powder-spreading device 30. Ideally, the transverse horizontal direction D36 in which a slide 36 travels is perpendicular to the horizontal direction D35 of travel of the carriage 35 of the spreading device 30. Advantageously, the means driving and guiding the translational movement of a slide may be positioned outside the manufacturing chamber in order not to clutter this manufacturing chamber.

A powder-distribution device 32 is provided above each slide 36, and therefore above each mobile receiving surface 28. Each slide 36, and therefore each mobile receiving surface 28, is elongated in shape in the transverse horizontal direction D36 and travels under the powder-distribution device when the slide passes from its retracted position to its deployed position.

Figure 4:
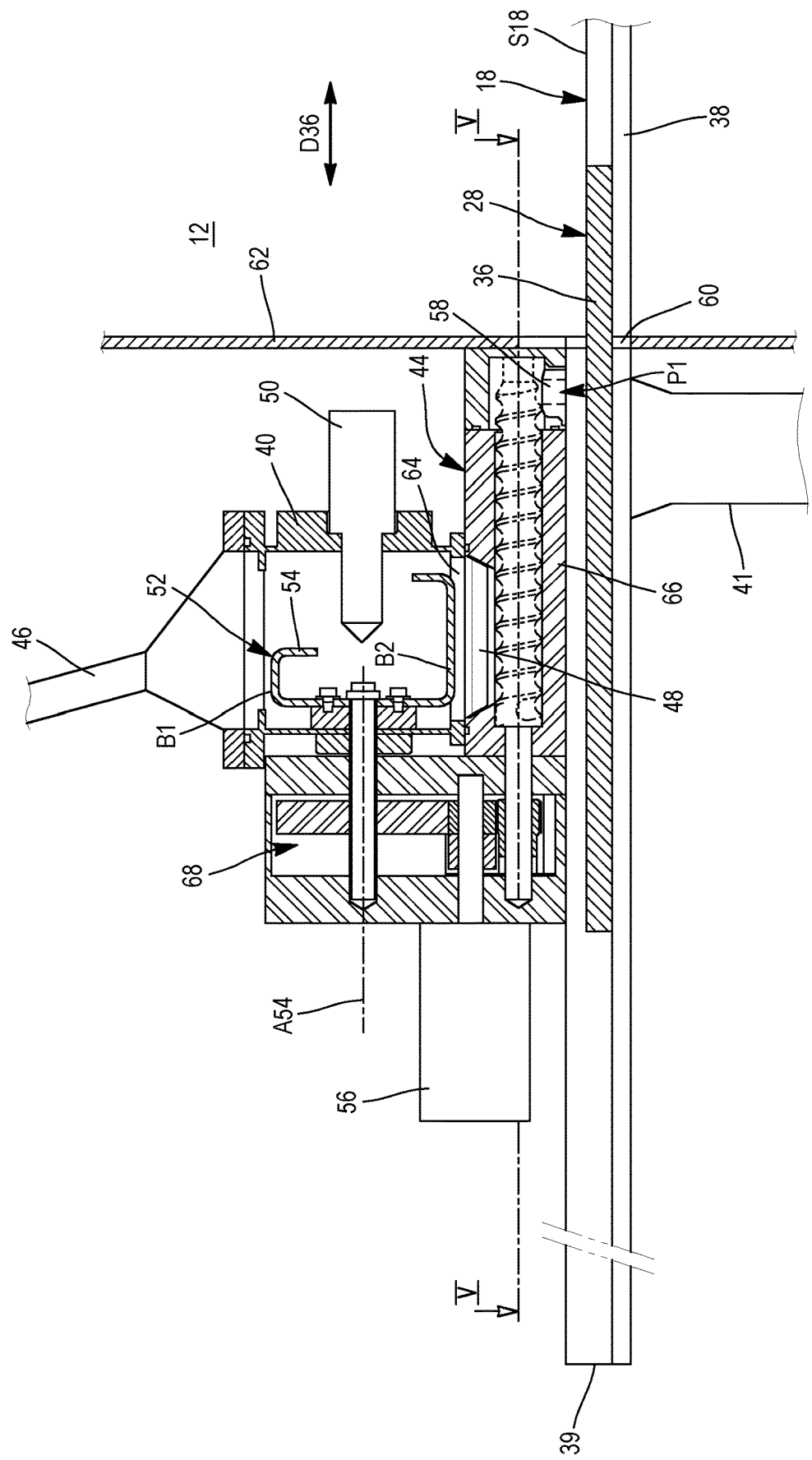
FIG. 4 is a view in longitudinal section of the powder-distribution device of an additive manufacturing machine according to the invention.

As a preference and as shown by FIGS. 2 and 4, each slide 36 is mounted with the ability to effect translational movement in a slot 38 provided in the working plane 18 of the manufacturing chamber 12 and in a housing 39 mounted opposite the slot provided in the working plane 18. A housing 39 is held against the working plane 18. A slide 36 moves translationally between a slot 38 and a housing 39 so as to become positioned in the housing 39 when in the retracted position and in the slot 38 when in the deployed position. A slot 38 extends in the transverse horizontal direction D36 in which a slide 36 moves. A housing 38 extends in the transverse horizontal direction D36 in which a slide 36 moves. A housing 39 is connected in fluidtight manner to the manufacturing chamber 12. Each slot 38 extends in the vicinity of a manufacturing zone 20. Each slot 38 is arranged in such a way that the mobile powder-receiving surface 28 formed by each slide moves in the working plane 18. In other words, when a slide 36 is in the deployed position, the receiving surface 28 formed by this slide is situated in the continuation of the upper surface S18 of the working plane. Advantageously, a housing 39 is equipped with a powder-recovery hopper 41.

By being mounted with the ability to effect translational movement in the vicinity of the manufacturing zone 20 and in the working plane 18, each slide 36 occupies a very small amount of space in the vicinity of the manufacturing zone 20.

Because each mobile receiving surface 28 adopts the form of a translationally mobile slide, a manufacturing zone 20 preferably adopts a rectangular shape. However, a manufacturing zone 20 may also adopt other shapes better suited to the shapes of the component or components being manufactured, such as a circular, oval or annular shape for example.

In order to create a layer of powder on the manufacturing zone 20, a powder-distribution device 32 delivers powder in the form of a run onto the mobile powder-receiving surface 28 formed by a slide, then the scraper and/or the rollers of the powder-spreading device spread the powder deposited in the form of a run over the manufacturing zone 20.

In order to create a run of powder on a mobile powder-receiving surface 28, this receiving surface moves translationally beneath a powder-distribution device 32. For the best possible control of the quantity of powder deposited on the mobile receiving surface 28 and therefore of the quality of the run of powder, the present invention proposes a powder-distribution device that allows the delivery of a stable and controlled rate of flow of powder at least at one distribution point beneath which a mobile powder-receiving surface moves.

Figure 3:
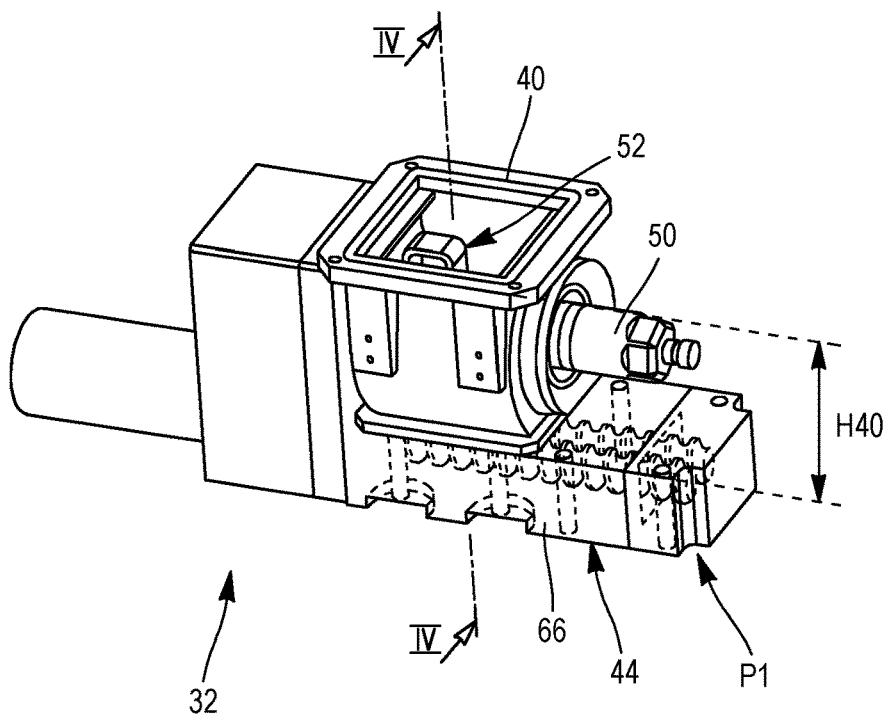
FIG. 3 is a perspective and partially transparent view of the powder-distribution device of an additive manufacturing machine according to the invention.

According to the invention, and as illustrated in FIGS. 2, 3 and 4, such a powder-distribution device 32 comprises a buffer reservoir 40 connected to a powder supply 42, and a powder-distribution point P1 beneath which a mobile receiving surface 28 moves.

Still according to the invention, this powder-distribution device 32 also comprises a screw-type metering device 44 connecting the buffer reservoir 40 and the powder-distribution point P1 and enabling the generation of a continuous stream of powder from the buffer reservoir 40 towards the powder-distribution point P1.

Because a powder-receiving surface 28 is able to move, a powder-distribution device 32 is preferably mounted fixedly with respect to the manufacturing chamber 12 and to the frame of the machine. Mounting a powder-distribution device 32 fixedly makes it easier to supply with powder.

The powder supply 42 preferably takes the form of a valve 43 to which a container 45 is removably connected. The container 45 contains the powder intended to feed the buffer reservoir 40 of a distribution device 32. The valve 43 allows the passage of powder towards a powder-distribution device 32 to be permitted or prevented. Once empty of its powder, the container in place is replaced with a new container full of powder. Advantageously, the container contains a sufficient quantity of powder, of the order of several tens of litres of powder, for an entire additive manufacturing cycle. This is because it is not conceivable to interrupt a manufacturing cycle in order to replace an empty container with a container full of powder. Alternatively, the powder supply 42 may also adopt the form of an automated powder supply circuit making it possible for example to supply powder to a plurality of additive manufacturing machines.

As illustrated in FIG. 2, the buffer reservoir 40 of a powder-distribution device 32 is connected to a powder supply 42, and notably to the valve 43, by a pipe 46. In instances in which the machine 10 comprises two powder-distribution devices 32 provided one on each side of the one same manufacturing zone, these two powder-distribution devices 32 are preferably connected to the same powder supply 42 and therefore to the one same valve 43.

In order to allow the powder to flow under the effect of gravity from the powder supply 42 to the buffer reservoir 40 of a powder-distribution device 32, a pipe 46 is preferably fitted with an inclination of at least five degrees with respect to a horizontal direction. As a preference, a pipe 46 is metal and rigid, and for example made of stainless steel.

A buffer reservoir 40 always contains a minimum quantity of powder in order to fill the inlet 48 of the screw-type metering device 44 with powder. As a concrete example, a buffer reservoir 40 has a capacity of around half a litre of powder and always contains at least 10 cm of powder during a manufacturing cycle. In order to maintain this minimum quantity of powder in a buffer reservoir 40, a powder-distribution device 32 comprises a detector 50 of the level of powder in the buffer reservoir 40. This detector 50 takes the form of a high-frequency capacitive sensor, or of a sensor that is equivalent in terms of functionalities, able to detect metallic or non-metallic powders, such as ceramic powders for example. When this detector measures an insufficient quantity of powder in the buffer reservoir 40, the valve 43 is operated in such a way as to deliver powder to the buffer reservoir 40 via a pipe 46.

To complement the powder detector 50, a powder-distribution device 32 comprises a powder-unpacking device 52 to loosen the powder contained in a buffer reservoir 40. This unpacking device 52 makes it possible to avoid hollowed-out arches of powder being created in a buffer reservoir 40 and therefore makes it possible to avoid the screw-type metering device 44 experiencing an irregular supply of powder. The unpacking device 52 adopts for example the form of a blade 54 driven in its movement by an actuator 56 inside the buffer reservoir 40. As a preference, the blade 54 is driven in rotation inside the buffer reservoir 40. Still as a preference, the blade 54 comprises two arms B1, B2 extending one on either side of its rotation axis A54 and to a non-zero distance from this rotation axis A54. To encourage the unpacking, one of the arms B1 is shorter than the other arm B2. Again to encourage unpacking, the two arms B1, B2 are curved at their free end. In a variant, vibrations or ultrasound may be employed in place the blade 54 in order to create the unpacking loosening effect inside the buffer reservoir 40.

As indicated previously, a powder-distribution device 32 allows a stable and controlled rate of flow of powder to be delivered to a distribution point P1 beneath which a mobile powder-receiving surface 28 moves. In greater detail, the outlet 58 of the screw-type metering device 44 corresponds to the powder-distribution point P1. As illustrated in FIG. 4, a powder-distribution device 32 is mounted above the housing 39 in which a slide 36 effects a translational movement. More specifically, the screw-type metering device 44 is mounted above the housing 39 that houses the slide 36 in the retracted position. Thus, the outlet 58 of the screw-type metering device P1 is situated above the slide 36 in the retracted position.

In order to preserve the qualities of the powder and avoid the risks of oxidation, a powder-distribution point P1 is situated in a housing 39 held firmly against the working plane 18 and connected in a fluidtight manner to the manufacturing chamber 12. As illustrated in FIG. 4, a housing 39 communicates with the manufacturing chamber 12 via an opening 60 made in a wall 62 of this chamber. Thus, the inert gas or gases present in the manufacturing chamber 12 are also present inside a housing 39 in which a powder-distribution point P1 is situated. In greater detail, the inert gas or gases present in the manufacturing chamber 12 are also present in the screw-type metering device 44, in the buffer reservoir 40, in the pipe or pipes 46, in the valve 43 and in the container 45. Thus, the qualities of the powder are protected, from the container 45 all the way to the manufacturing zone 20. Also, the manufacturing chamber 12, a housing 39, a screw-type metering device 44, a buffer reservoir 40, a pipe 46, the valve 43 and the container 45 are all connected in a fluidtight manner.

Alternatively, and in order to limit the bulkiness of a powder-distribution device 32 on the outside of the manufacturing chamber, the outlet 58 of the screw-type metering device 44 that corresponds to the powder-distribution point P1 may be situated inside the manufacturing chamber 12 while the buffer reservoir 40 is still situated outside the manufacturing chamber.

As illustrated in FIG. 4, the buffer reservoir 40 is mounted rigidly above the inlet 48 of the screw-type metering device 44. Ideally, and in order to avoid the creation of hollowed-out arches or clumps of powder, the outlet 64 of the buffer reservoir 40 has a cross section that is substantially identical (shape and dimensions) to the cross section of the inlet 48 of the screw-type metering device 44. For the same reason, the buffer reservoir 40 has a cross section that is constant over its entire height H40, and the outlet 64 of the buffer reservoir 40 has a cross section that is substantially identical (shape and dimensions) to the cross section of the buffer reservoir 40 over its entire height H40.

In the present invention, it is the combination of a buffer reservoir 40 with a screw-type metering device 44 which allows a stable and controlled rate of flow of powder to be delivered to the distribution point P1.

In more detail, the screw-type metering device 44 comprises a barrel 66 and at least one powder-conveying screw V1 rotationally driven inside this barrel.

However, as a preference, the screw-type metering device 44 comprises two powder-conveying screws V1, V2 juxtaposed inside the one same barrel 66 and rotationally driven inside this barrel. The use of two screws allows the rate of flow of powder leaving the metering device to be kept more stable.

Figure 5:
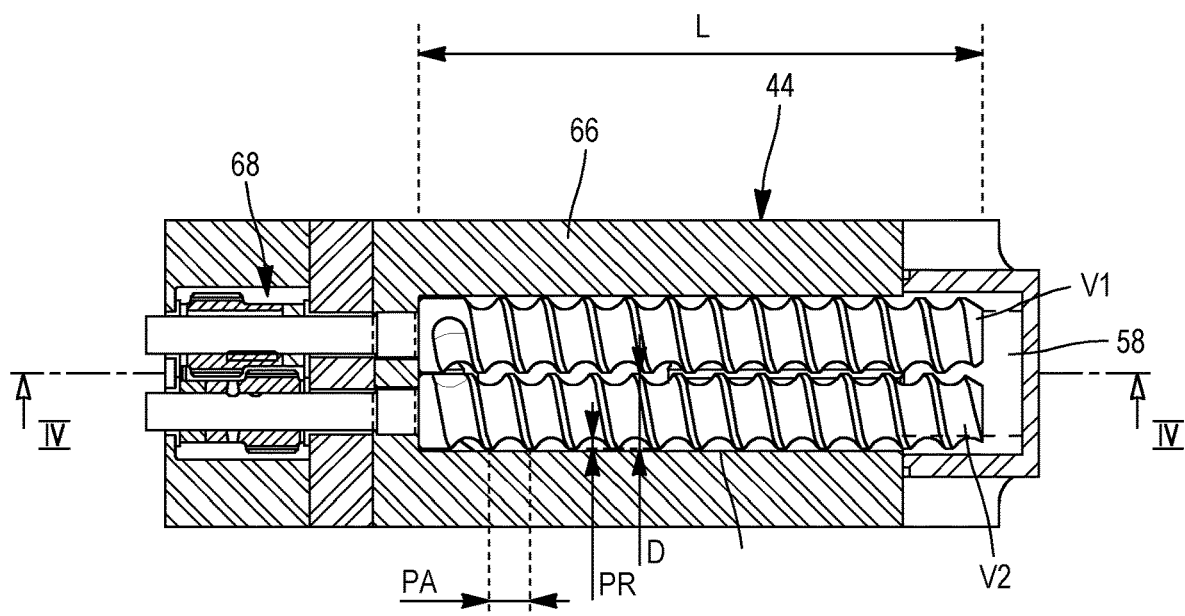
FIG. 5 is a view in transverse section of the screw-type metering device of the powder-distribution device of an additive manufacturing machine according to the invention.

According to a first variant illustrated in FIG. 5, the two screws V1, V2 of the metering device have pitches of the same hand. By having pitches of the same hand, the two screws are able to stabilize the rate of flow of powder leaving the metering device even better.

According to a second variant, the two screws V1, V2 of the metering device have pitches of the opposing hand.

Still with a view to obtaining the most stable possible rate of flow of powder leaving the metering device, the two screws V1, V2 of the metering device are synchronized in rotation and the two screws V1, V2 of the metering device rotate in the same, clockwise or anticlockwise, direction. To that end, the two screws V1 and V2 are driven in rotation by the one same actuator 56. In more detail, the two screws V1 and V2 are driven by the one same motor 56 via gearing 68.

The two screws V1, V2 are mounted parallel to one another inside the barrel 66. The two screws V1, V2 have the same length and their length L is around twenty-two centimetres. The two screws V1, V2 have the same outside diameter D of around two centimetres. The two screws V1, V2 have identical threads with a pitch PA of eleven millimetres and a depth PR of three millimetres. The two screws V1, V2 are juxtaposed in such a way that a clearance of just 0.1 millimetre separates them in the barrel 66. Likewise, a clearance of a mere 0.1 millimetre is present between the screws and the internal wall 67 of the barrel 66. The two screws V1, V2 have concave threads, which means to say that they have a dished profile of rounded shape, encouraging the entrainment of powder toward the powder-distribution point.

Advantageously, the motor 56 driving the rotation of the two screws V1 and V2 is also able to drive the rotation of the blade 54 of the unpacking device 52, via the gearing 68.

Advantageously, by varying the rate of travel of the mobile receiving surface 28, and therefore of a slide 36, during the distribution of powder, it is possible to vary the height of the run of powder deposited on the slide 36. That makes it possible as best as possible to adjust the quantity of powder deposited on the mobile receiving surface 28 to suit a manufacturing zone 20 having at least two different lengths in the horizontal direction D35 of translational movement of the carriage 35, such as, for example, in the case of a manufacturing zone 20 that is circular.

Once the run of powder has been deposited on a mobile receiving surface 28 via the distribution point P1, the spreading device 30 is set into a translational movement to spread the powder over the manufacturing zone 20.

As a preference, the container 45, the valve 43, the pipe or pipes 46, the buffer reservoir or reservoirs 40 and the screw or screws and the barrel of the metering device 40 are made from a stainless and non-magnetic steel so as to avoid magnetising metallic powders.

Ideally, a powder-distribution point P1 is situated approximately two centimetres above a mobile receiving surface 28. This height is sufficient to allow a run of powder several millimetres in height to be deposited on the mobile receiving surface 28 and avoid powder being sprayed beyond the mobile receiving surface 28.

The invention claimed is:

1. A powder bed fusion additive manufacturing machine comprising:
    a manufacturing chamber and at least one source of heat or of energy used to selectively melt a layer of an additive manufacturing powder deposited inside the manufacturing chamber;
    two mobile powder-receiving surfaces able to move in a vicinity of a manufacturing zone situated inside the manufacturing chamber;
    a powder-spreading device for spreading the additive manufacturing powder on the at mobile powder-receiving surfaces toward the manufacturing zone; and
    two powder-distribution devices, each device distributing additive manufacturing powder over one of the two mobile powder-receiving surfaces,
    wherein each mobile powder-receiving surface is in a form of a solid block mounted with an ability to effect translational movement in a horizontal direction that is transverse in relation to the manufacturing zone,
    wherein each powder-distribution device comprises a buffer reservoir connected to a powder supply and a powder-distribution point beneath which one of the two mobile powder-receiving surfaces moves, wherein each powder-distribution device comprises a screw-type metering device connecting the buffer reservoir and the powder-distribution point and enabling generation of a continuous stream of additive manufacturing powder from the buffer reservoir toward each powder-distribution point, wherein the screw-type metering device comprises a barrel and two powder-conveying screws juxtaposed inside the barrel and rotationally driven inside the barrel, wherein the two screws of the metering device are synchronized in rotation and the two screws of the metering device rotate in the same, clockwise or anticlockwise, direction, wherein a powder-distribution device comprises a powder-unpacking device to loosen the powder contained in the buffer reservoir, wherein the unpacking device adopts the form of a blade driven in rotation around a horizontal axis inside the buffer reservoir by a motor, wherein the two screws are driven in rotation by the one same motor via a gearing, and wherein the motor driving the rotation of the two screws is also able to drive the rotation of the blade of the unpacking device via the gearing.

2. The powder bed fusion additive manufacturing machine according to claim 1, wherein the two powder-conveying screws of the metering device have pitches of a same hand.

3. The powder bed fusion additive manufacturing machine according to claim 1, wherein the two powder-conveying screws of the metering device have pitches of an opposing hand.

4. The powder bed fusion additive manufacturing machine according to claim 1, wherein the at least one powder-distribution device comprises a detector of a level of additive manufacturing powder in the buffer reservoir.

5. The powder bed fusion additive manufacturing machine according to claim 1, wherein, with the manufacturing chamber comprising a horizontal working plane and at least one manufacturing zone situated in the horizontal working plane, the slide is mounted with an ability to effect translational movement in a slot provided in the horizontal working plane and in a housing mounted opposite the slot provided in the horizontal working plane.

6. The powder bed fusion additive manufacturing machine according to claim 5, wherein the at least one powder-distribution device is mounted above the housing in which the slide effects the translational movement.

7. The powder bed fusion additive manufacturing machine according to claim 1, wherein, with the manufacturing chamber comprising a horizontal working plane and at least one manufacturing zone situated in the horizontal working plane, a powder-distribution point is situated in a housing held firmly against the horizontal working plane and connected in a fluidtight manner to the manufacturing chamber.

* * * * *